US012570285B2

(12) United States Patent
Ueyama et al.

(10) Patent No.: US 12,570,285 B2
(45) Date of Patent: Mar. 10, 2026

(54) CONTROLLER, METHOD, AND COMPUTER PROGRAM FOR CONTROLLING VEHICLE SPEED

(71) Applicant: TOYOTA JIDOSHA KABUSHIKI KAISHA, Toyota (JP)

(72) Inventors: Masao Ueyama, Kawasaki (JP); Ichi Gi, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 18/173,862

(22) Filed: Feb. 24, 2023

(65) Prior Publication Data

US 2023/0294692 A1     Sep. 21, 2023

(30) Foreign Application Priority Data

Mar. 15, 2022     (JP) ................................. 2022-040560

(51) Int. Cl.
| | |
|---|---|
| *G07C 5/00* | (2006.01) |
| *B60W 30/14* | (2006.01) |
| *B60W 40/072* | (2012.01) |
| *G07C 5/02* | (2006.01) |
| *G07C 5/04* | (2006.01) |
| *G07C 5/08* | (2006.01) |

(52) U.S. Cl.
CPC ........ *B60W 30/143* (2013.01); *B60W 40/072* (2013.01); *B60W 2552/10* (2020.02); *B60W 2552/30* (2020.02); *B60W 2552/53* (2020.02); *B60W 2556/40* (2020.02)

(58) Field of Classification Search
CPC ............. B60W 30/143; B60W 40/072; B60W 2552/53; B60W 2556/40; B60W 2552/30; B60W 2552/10
See application file for complete search history.

(56) References Cited

U.S. PATENT DOCUMENTS

| | | | |
|---|---|---|---|
| 8,024,099 B2 * | 9/2011 | Suzuki | ............... B60K 31/0066 |
| | | | 701/72 |
| 2002/0177936 A1 * | 11/2002 | Matsui | ................. G05D 1/0272 |
| | | | 180/170 |

(Continued)

FOREIGN PATENT DOCUMENTS

| | | |
|---|---|---|
| JP | H10-269498 A | 10/1998 |
| JP | 2011-028625 A | 2/2011 |
| JP | 2017052435 A | 3/2017 |

*Primary Examiner* — Kito R Robinson
*Assistant Examiner* — Anthony Gabriel Mora
(74) *Attorney, Agent, or Firm* — Dickinson Wright, PLLC

(57)     ABSTRACT

A vehicle speed controller includes a processor configured to detect a current lane in which a vehicle is traveling, detect a start point at which a curved road section starts within a predetermined distance ahead of the vehicle, estimate the curvature of the current lane in the road section, determine whether the current lane is a fast lane or a slow lane, set a reference speed of the vehicle so that the reference speed decreases as the curvature of the current lane increases and that the reference speed is greater when the current lane is the fast lane than when the current lane is the slow lane, and control the speed of the vehicle so that the speed of the vehicle at the start point of the road section will not be greater than the reference speed.

8 Claims, 6 Drawing Sheets

(56) References Cited

U.S. PATENT DOCUMENTS

| | | | |
|---|---|---|---|
| 2005/0216161 A1* | 9/2005 | Sakugawa | B60T 8/1755 |
| | | | 701/1 |
| 2008/0059037 A1* | 3/2008 | Isaji | B60W 10/20 |
| | | | 701/93 |
| 2009/0234550 A1* | 9/2009 | Takeuchi | B60W 30/18009 |
| | | | 701/70 |
| 2009/0319113 A1* | 12/2009 | Lee | B62D 15/025 |
| | | | 701/1 |
| 2010/0138115 A1* | 6/2010 | Kageyama | B60R 21/0134 |
| | | | 701/45 |
| 2012/0140039 A1* | 6/2012 | Ota | B60W 30/12 |
| | | | 348/148 |
| 2017/0072951 A1* | 3/2017 | Sakaguchi | B60W 30/143 |
| 2017/0240176 A1* | 8/2017 | Aoki | B60W 50/082 |
| 2018/0022383 A1* | 1/2018 | Kunihiro | B62D 7/159 |
| | | | 701/41 |
| 2018/0059674 A1* | 3/2018 | Kunisa | B60W 60/0057 |
| 2019/0126928 A1* | 5/2019 | Sakaguchi | B60W 10/06 |
| 2019/0304302 A1* | 10/2019 | Knauer | G06V 20/582 |
| 2020/0180617 A1* | 6/2020 | Tezuka | B60W 30/14 |
| 2020/0207346 A1* | 7/2020 | Tsuji | B60W 30/12 |
| 2020/0290621 A1* | 9/2020 | Ji | B60W 50/14 |
| 2020/0307593 A1* | 10/2020 | Hirosawa | B60W 10/04 |
| 2020/0377102 A1* | 12/2020 | Kuwahara | B60W 40/04 |
| 2020/0398750 A1* | 12/2020 | Aizawa | B62J 50/22 |
| 2021/0300364 A1* | 9/2021 | Sadamura | B60W 30/146 |
| 2022/0084262 A1* | 3/2022 | Sung | B60K 35/22 |
| 2023/0136434 A1* | 5/2023 | Zhao | B60W 40/072 |
| | | | 701/41 |

* cited by examiner

CONTROLLER, METHOD, AND COMPUTER PROGRAM FOR CONTROLLING VEHICLE SPEED

FIELD

The present invention relates to a controller, a method, and a computer program for controlling vehicle speed.

BACKGROUND

In autonomous driving control of a vehicle, vehicle speed is controlled so that the vehicle can travel through a curve safely (see Japanese Unexamined Patent Publication JPH10-269498A).

A vehicle speed controller disclosed in JPH10-269498A detects a curve of a road ahead of a vehicle, based on road map information and the current position of the vehicle, and detects the radius of curvature of the detected curve. The vehicle speed controller then calculates a curve entry speed of the vehicle at which the vehicle can follow the curve, based on the radius of curvature of the curve. In addition, the vehicle speed controller detects a driver's state of driving, and sets a deceleration start distance at which the vehicle should start decelerating, based on the driver's state of driving, the curve entry speed, and the vehicle speed. When the distance from the start point of the curve to the vehicle falls within the deceleration start distance, the vehicle speed controller reduces the vehicle speed to the curve entry speed.

SUMMARY

In a curved road section including multiple lanes, the curvature of the curve differs among the lanes. Thus the degree of limitation of vehicle speed for a vehicle to travel safely may differ, depending on which lane the vehicle is traveling on. In particular, the degree of limitation of vehicle speed may be greater when the vehicle is traveling on a passing lane than when the vehicle is traveling on a travel lane, depending on the direction of the curve. In such a case, reducing the vehicle speed to a curve entry speed may make a driver feel uncomfortable.

It is an object of the present invention to provide a vehicle speed controller that can appropriately control the speed of a vehicle traveling through a curve while preventing motion of the vehicle from making a driver feel uncomfortable.

According to an embodiment, a vehicle speed controller is provided. The vehicle speed controller includes a processor configured to: detect a current lane in which a vehicle is traveling, detect a start point at which a curved road section starts within a predetermined distance ahead of the vehicle, based on map information or a sensor signal obtained by a sensor provided on the vehicle for sensing the situation around the vehicle, estimate the curvature of the current lane in the road section, determine whether the current lane is a fast lane where travel at a relatively high speed is allowed in the road section or a slow lane where travel at a relatively low speed is required in the road section, by referring to the map information, set a reference speed of the vehicle so that the reference speed decreases as the curvature of the current lane increases and that the reference speed is greater when the current lane is the fast lane than when the current lane is the slow lane, and control the speed of the vehicle so that the speed of the vehicle at the start point of the road section will not be greater than the reference speed.

In the vehicle speed controller, the processor preferably sets one of lanes included in the road section as a reference lane, and sets the reference speed, based on the curvature of the reference lane.

In this case, the processor preferably sets the slow lane of the lanes included in the road section as the reference lane.

Alternatively, the processor preferably sets an innermost lane in the curved road section as the reference lane.

Alternatively, the processor preferably sets the fast lane as the reference lane when the road section curves toward the fast lane, and sets the current lane as the reference lane when the road section curves toward the slow lane.

When the reference lane differs from the current lane, the processor preferably determines the number of lanes from the reference lane to the current lane and the width of each lane in the road section, based on the map information, and calculates the curvature of the reference lane by correcting the curvature of the current lane, based on the distance obtained by multiplying the number of lanes by the width of each lane.

According to another embodiment, a method for controlling vehicle speed is provided. The method includes detecting a current lane in which a vehicle is traveling; detecting a start point at which a curved road section starts within a predetermined distance ahead of the vehicle, based on map information or a sensor signal obtained by a sensor provided on the vehicle for sensing the situation around the vehicle; estimating the curvature of the current lane in the road section; determining whether the current lane is a fast lane where travel at a relatively high speed is allowed in the road section or a slow lane where travel at a relatively low speed is required in the road section, by referring to the map information; setting a reference speed of the vehicle so that the reference speed decreases as the curvature of the current lane increases and that the reference speed is greater when the current lane is the fast lane than when the current lane is the slow lane; and controlling the speed of the vehicle so that the speed of the vehicle at the start point of the road section will not be greater than the reference speed.

According to still another embodiment, a non-transitory recording medium that stores a computer program for controlling vehicle speed is provided. The computer program includes instructions causing a processor mounted on a vehicle to execute a process including detecting a current lane in which the vehicle is traveling; detecting a start point at which a curved road section starts within a predetermined distance ahead of the vehicle, based on map information or a sensor signal obtained by a sensor provided on the vehicle for sensing the situation around the vehicle; estimating the curvature of the current lane in the road section; determining whether the current lane is a fast lane where travel at a relatively high speed is allowed in the road section or a slow lane where travel at a relatively low speed is required in the road section, by referring to the map information; setting a reference speed of the vehicle so that the reference speed decreases as the curvature of the current lane increases and that the reference speed is greater when the current lane is the fast lane than when the current lane is the slow lane; and controlling the speed of the vehicle so that the speed of the vehicle at the start point of the road section will not be greater than the reference speed.

The vehicle speed controller according to the present disclosure has an advantageous effect of being able to appropriately control the speed of a vehicle traveling through a curve while preventing motion of the vehicle from making a driver feel uncomfortable.

BRIEF DESCRIPTION OF DRAWINGS

FIG. 1 schematically illustrates the configuration of a vehicle control system equipped with a vehicle speed controller.

FIG. 3 is a functional block diagram of a processor of the electronic control unit, related to a vehicle speed control process.

DESCRIPTION OF EMBODIMENTS

A vehicle speed controller, a method for controlling vehicle speed executed by the vehicle speed controller, and a computer program therefor will now be described with reference to the attached drawings. The vehicle speed controller automatically controls the speed of a vehicle when the vehicle enters a curve so that the vehicle can travel through the curve safely.

To achieve this, the vehicle speed controller detects a lane in which the vehicle is traveling (hereafter the "current lane"), and determines whether the detected current lane is a fast lane where travel at a relatively high speed is allowed or a slow lane where travel at a relatively low speed is required in a curved road section ahead of the vehicle. In addition, the vehicle speed controller sets a reference speed of the vehicle so that the reference speed decreases as the curvature of the current lane increases and that the reference speed is not less when the current lane is a fast lane than when the current lane is a slow lane. The vehicle speed controller then controls the speed of the vehicle so that the speed of the vehicle at the start point of the curved road section will not be greater than the reference speed. In the following, a curved road section will be referred to simply as a "curve section."

Figure 1:
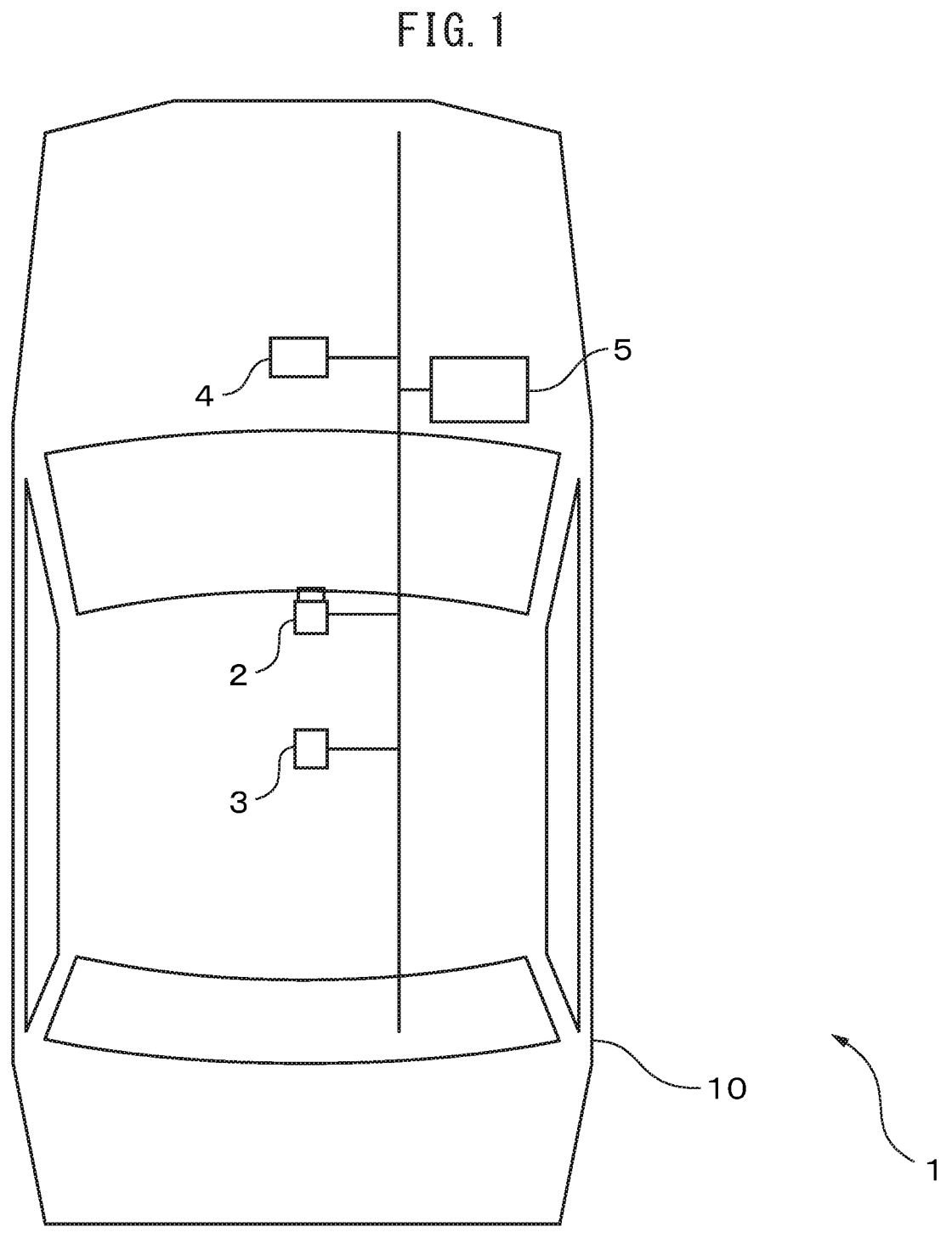
Figure 2:
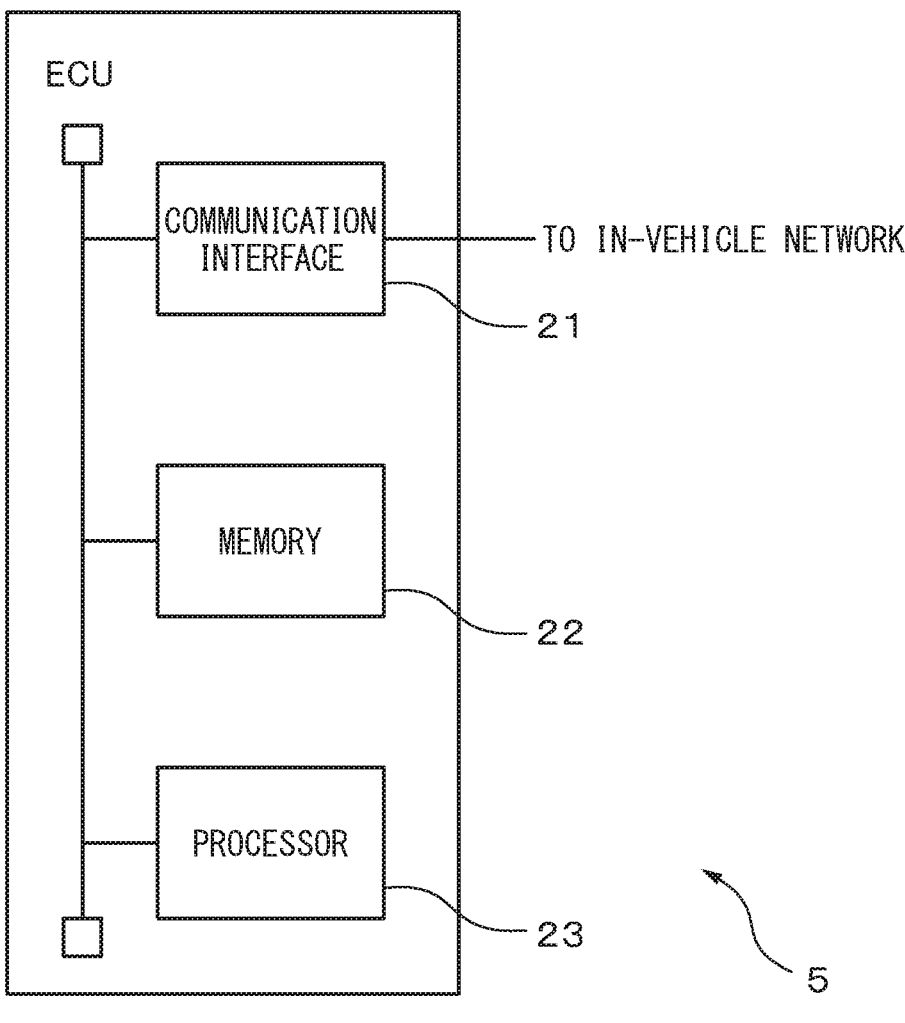
FIG. 2 illustrates the hardware configuration of an electronic control unit, which is an embodiment of the vehicle speed controller.

FIG. 1 schematically illustrates the configuration of a vehicle control system equipped with the vehicle speed controller. FIG. 2 illustrates the hardware configuration of an electronic control unit, which is an embodiment of the vehicle speed controller. In the present embodiment, the vehicle control system 1, which is mounted on a vehicle 10 and controls the vehicle 10, includes a camera 2, a GPS receiver 3, a storage device 4, and an electronic control unit (ECU) 5, which is an example of the vehicle speed controller. The camera 2, the GPS receiver 3, and the storage device 4 are communicably connected to the ECU 5 via an in-vehicle network conforming to a standard such as a controller area network. The vehicle control system 1 may further include a range sensor (not illustrated), such as LiDAR or radar, which measures the distances from the vehicle 10 to objects around the vehicle 10; a wireless communication terminal (not illustrated) for communicating with another device; and a navigation device (not illustrated) for setting a planned travel route of the vehicle 10.

The camera 2, which is an example of a sensor for sensing the situation around the vehicle 10, includes a two-dimensional detector constructed from an array of optoelectronic transducers, such as CCD or C-MOS, having sensitivity to visible light and a focusing optical system that forms an image of a target region of capturing on the two-dimensional detector. The camera 2 is mounted, for example, in the interior of the vehicle 10 so as to be oriented, for example, to the front of the vehicle 10. The camera 2 captures a region in front of the vehicle 10 every predetermined capturing period (e.g., 1/30 to 1/10 seconds), and generates images representing the region. Each image obtained by the camera 2 is an example of the sensor signal. The vehicle 10 may include multiple cameras taking pictures in different orientations or having different focal lengths.

Whenever an image is generated, the camera 2 outputs the generated image to the ECU 5 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the ECU 5 via the in-vehicle network at predetermined intervals. Instead of the GPS receiver, the vehicle 10 may include a receiver that receives positioning signals from satellites of another satellite positioning system to determine the position of the vehicle 10.

The storage device 4, which is an example of a storage unit, includes, for example, a hard disk drive, a nonvolatile semiconductor memory, or an optical medium and an access device therefor. The storage device 4 stores a high-precision map, which is an example of the map information. The high-precision map includes information indicating the number of lines, the widths of the lines, and road markings such as lane-dividing lines or stop lines in road sections included in a predetermined region represented in the map; information indicating signposts placed in the road sections; and information indicating regulation speeds of the road sections. The high-precision map further includes information indicating the positions of both ends of individual curve sections in the road sections. The high-precision map may further include information indicating the curvatures of the individual curve sections.

The storage device 4 may further include a processor for executing, for example, a process to update the high-precision map and a process related to a request from the ECU 5 to read out the high-precision map. For example, whenever the vehicle 10 moves a predetermined distance, the storage device 4 may transmit a request to obtain a high-precision map, together with the current position of the vehicle 10, to a map server via a wireless communication terminal (not illustrated), and receive a high-precision map of a predetermined region around the current position of the vehicle 10 from the map server via the wireless communication terminal. When a request from the ECU 5 to read out the high-precision map is received, the storage device 4 cuts out that portion of the high-precision map stored therein which includes the current position of the vehicle 10 and which represents a region smaller than the predetermined region, and outputs the cut portion to the ECU 5 via the in-vehicle network.

The ECU 5 automatically controls the speed of the vehicle 10. In particular, the ECU 5 controls the speed of the vehicle 10 so that the vehicle 10 can travel through a curve section safely.

As illustrated in FIG. 2, the ECU 5 includes a communication interface 21, a memory 22, and a processor 23. The communication interface 21, the memory 22 and the processor 23 may be configured as separate circuits or a single integrated circuit.

The communication interface 21 includes an interface circuit for connecting the ECU 5 to the in-vehicle network. Whenever an image is received from the camera 2, the communication interface 21 passes the received image to the processor 23. Whenever positioning information is received from the GPS receiver 3, the communication interface 21 passes the positioning information to the processor 23. In addition, the communication interface 21 passes the high-precision map read from the storage device 4 to the processor 23.

The memory 22, which is another example of a storage unit, includes, for example, volatile and nonvolatile semiconductor memories, and stores various types of data used in a vehicle speed control process executed by the processor 23. For example, the memory 22 stores parameters of the camera 2 including the focal length, the direction of image capturing, and the mounted position as well as various parameters for defining a classifier used for detecting objects around the vehicle 10. The memory 22 further stores a prior deceleration table representing the relationship between curvatures and reference speeds, and a curve travel speed table representing the relationship between curvatures and travel speeds in curve sections. Further, the memory 22 stores positioning information of the vehicle 10, images of the surroundings of the vehicle 10, and the high-precision map. Further, the memory 22 temporarily stores various types of data generated during the vehicle speed control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle speed control process on the vehicle 10 at predetermined intervals.

Figure 3:
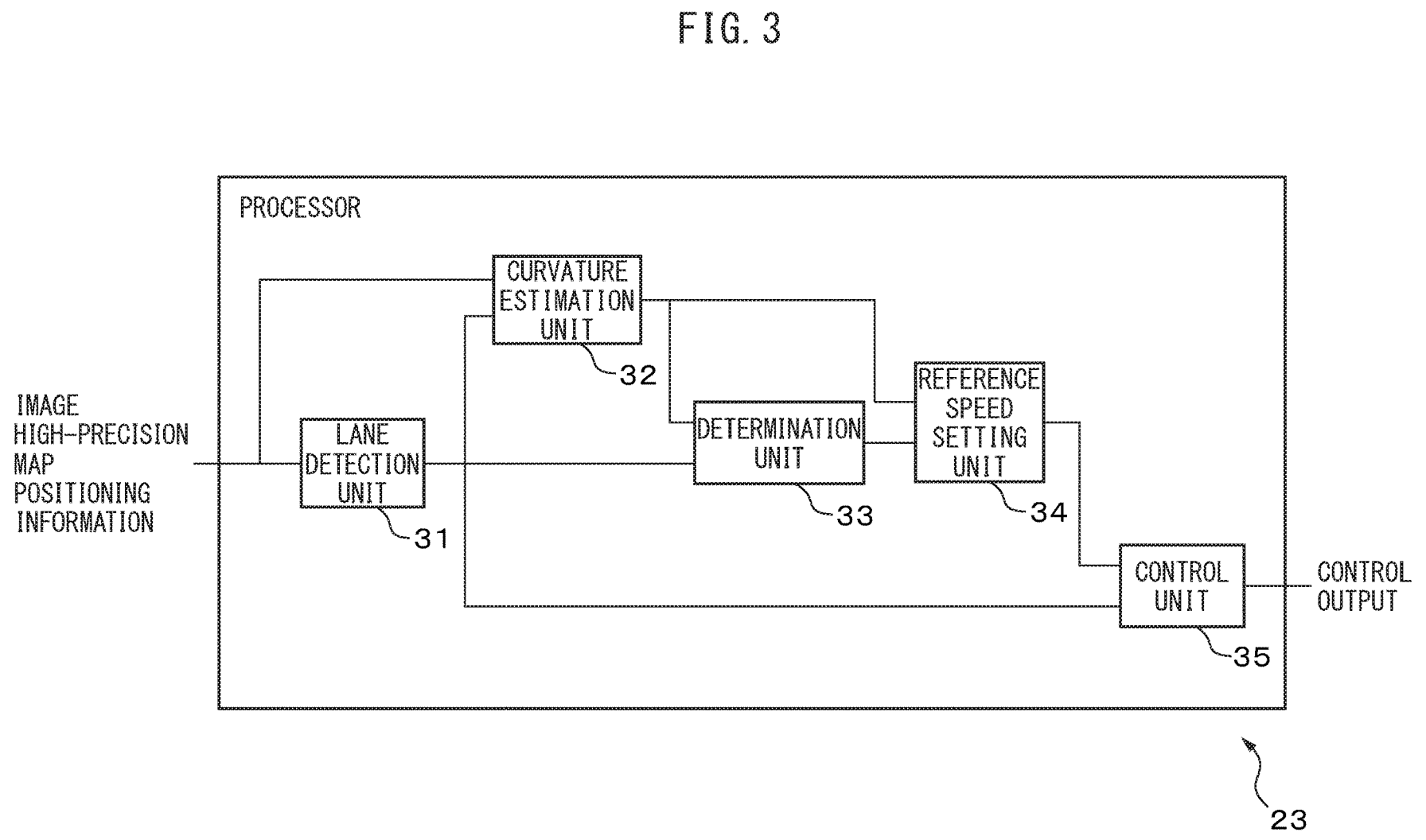

FIG. 3 is a functional block diagram of the processor 23, related to the vehicle speed control process. The processor 23 includes a lane detection unit 31, a curvature estimation unit 32, a determination unit 33, a reference speed setting unit 34, and a control unit 35. These units included in the processor 23 are functional modules, for example, implemented by a computer program executed by the processor 23, or may be dedicated operating circuits provided in the processor 23.

The lane detection unit 31 detects a current lane on which the vehicle 10 is traveling. In the present embodiment, the lane detection unit 31 compares an image generated by the camera 2 (hereafter simply an "image") with the high-precision map to detect the current lane. To achieve this, the lane detection unit 31 detects features on or near the road, such as road markings including lane-dividing lines, curbstones, or signposts, from an image. For example, the lane detection unit 31 inputs an image into a classifier to detect features represented in the image. As such a classifier, the lane detection unit 31 can use, for example, a deep neural network (DNN) having architecture of a convolutional neural network (CNN) type, e.g., Single Shot MultiBox Detector (SSD) or Faster R-CNN. Alternatively, as such a classifier, the lane detection unit 31 may use a DNN having architecture of a self-attention network (SAN) type, e.g., a Vision Transformer. Such a classifier is trained in advance to detect detection target features from an image. The classifier outputs information for identifying an object region including a feature detected in the inputted image and information indicating the type of the detected feature.

Upon detection of features, the lane detection unit 31 projects the individual features detected from the image onto the high-precision map or individual features on or near the road around the vehicle 10 represented in the high-precision map onto the image, with an assumption about the position and orientation of the vehicle 10. The lane detection unit 31 then estimates the position of the vehicle 10 to be the position and orientation thereof for the case where the features detected from the image match corresponding features represented in the high-precision map the best. The lane detection unit 31 identifies the lane including the position of the vehicle 10 as the current lane on which the vehicle 10 is traveling, by referring to the high-precision map.

The lane detection unit 31 uses initial values of the assumed position and orientation of the vehicle 10 and parameters of the camera 2, such as the focal length, the height of the mounted position, and the direction of image capturing, to determine the positions in the high-precision map or the image to which the features are projected. As the initial values of the position and orientation of the vehicle 10 is used the position of the vehicle 10 measured by the GPS receiver 3 or obtained by correcting, with odometry information, the position and orientation of the vehicle 10 estimated at the last lane detection. The lane detection unit 31 then calculates the degree of matching between the features on or near the road detected from the image and those represented in the high-precision map (e.g., the inverse of the sum of squares of the distances between the detected individual features and the corresponding features).

The lane detection unit 31 repeats the above-described process while varying the assumed position and orientation of the vehicle 10. The lane detection unit 31 determines the position and orientation for the case where the degree of matching is a maximum as the actual position of the vehicle 10.

When the accuracy of determination of the position of the vehicle 10 by the GPS receiver 3 is sufficient, the lane detection unit 31 may use the position of the vehicle 10 indicated by the latest positioning information received from the GPS receiver 3 as the actual position of the vehicle 10. The lane detection unit 31 may then identify the lane including the position of the vehicle 10 as the current lane on which the vehicle 10 is traveling, by referring to the high-precision map, as in the above-described embodiment.

Of the lane-dividing lines detected from the image, the lane detection unit 31 further identifies lane-dividing lines demarcating the current lane. For example, the lane detection unit 31 can identify the lane-dividing line closest to the center in the horizontal direction of the image, on the right of the center, at the position closest to the bottom of the image, i.e., at the position closest to the vehicle 10, as the right lane-dividing line demarcating the current lane. Similarly, the lane detection unit 31 can identify the lane-dividing line closest to the center in the horizontal direction of the image, on the left of the center, at the position closest to the bottom of the image as the left lane-dividing line demarcating the current lane.

The lane detection unit 31 notifies the curvature estimation unit 32, the determination unit 33, and the control unit 35 of information indicating the detected current lane and the position of the vehicle. In addition, the lane detection unit 31 notifies the curvature estimation unit 32 of the positions of pixels representing the left or right lane-dividing line demarcating the current lane detected from the image.

The curvature estimation unit 32 determines whether the start point of a curve section exists within a predetermined distance ahead of the vehicle 10 in the travel direction of the vehicle 10, by referring to the position of the vehicle 10 and the high-precision map. When a curve section whose start point is within a predetermined distance is detected, the curvature estimation unit 32 estimates the curvature of the current lane in the curve section. In the following, a curve section starting at a point within a predetermined distance ahead of the vehicle 10 in the travel direction of the vehicle 10 will be referred to simply as a "curve section" or a "detected curve section."

For example, the curvature estimation unit 32 selects three or more points farther than the start point of the detected curve section on the left or right lane-dividing line demarcating the current lane. The positions of pixels in an image correspond one-to-one to the directions viewed from the camera 2. In addition, the parameters of the camera 2, such as the direction of image capturing, the height of the mounted position, and the focal length of the camera 2, are known; and the lane-dividing line lies on the road surface. Thus, for each pixel representing the lane-dividing line in an image, the curvature estimation unit 32 can determine the real-space position of the point on the lane-dividing line represented in the pixel with respect to the camera 2, based on the parameters of the camera 2. For this reason, the curvature estimation unit 32 reads from the memory 22 an image generated after the detected curve section becomes included in the area captured by the camera 2, and selects three or more points farther than the start point of the detected curve section from the points represented in individual pixels representing the lane-dividing line in the image. The curvature estimation unit 32 then determines an approximation curve passing through the selected points, and determines the curvature of the approximation curve as that of the current lane in the detected curve section.

The curvature estimation unit 32 may execute the above-described process for each of the left and right lane-dividing lines of the current lane to calculate the curvatures, and determine an average of the calculated curvatures as the curvature of the current lane in the detected curve section. Alternatively, the curvature estimation unit 32 may use the curvature of the curve section represented in the high-precision map as that of the current lane in the curve section.

The curvature estimation unit 32 notifies the reference speed setting unit 34 of the curvature of the current lane in the detected curve section. In addition, the curvature estimation unit 32 notifies the determination unit 33 of information indicating the detected curve section.

The determination unit 33 determines whether the current lane in the detected curve section is a fast lane where travel at a relatively high speed is allowed in the curve section or a slow lane where travel at a relatively low speed is required in the curve section.

The determination unit 33 determines whether the current lane is a travel lane or a passing lane in the curve section by referring to the high-precision map. When the current lane is a travel lane, the determination unit 33 determines that the current lane is a slow lane. When the current lane is a passing lane, the determination unit 33 determines that the current lane is a fast lane.

Figure 4:
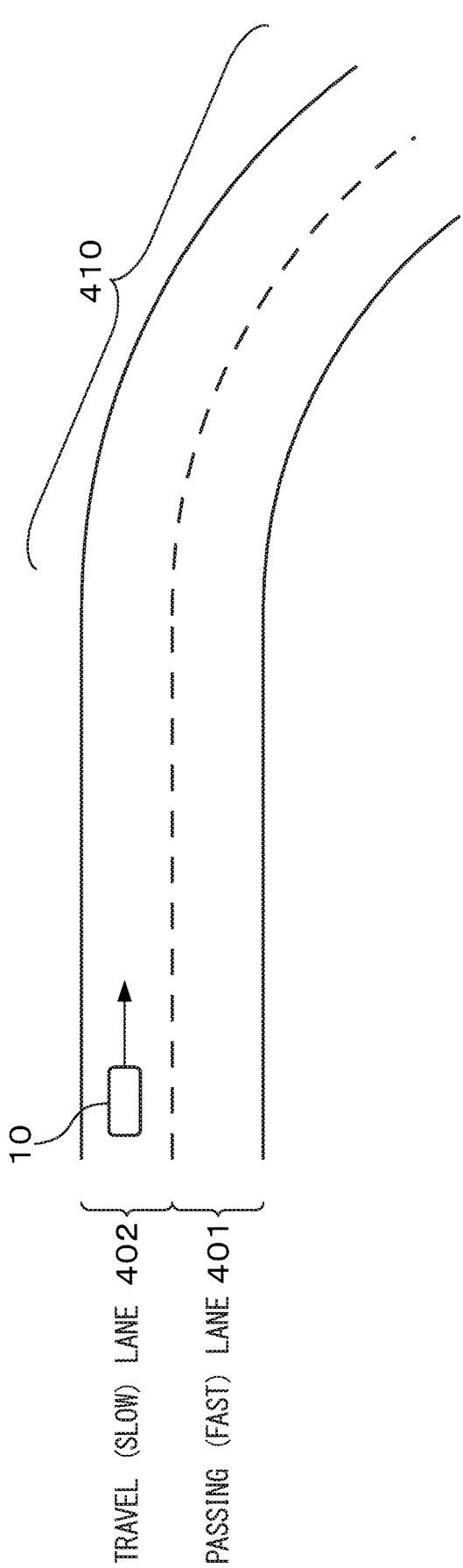
FIG. 4 illustrates an example of a slow lane and a fast lane.

FIG. 4 illustrates an example of a slow lane and a fast lane. In the example illustrated in FIG. 4, assume that a right lane 401 and a left lane 402 with respect to the travel direction of the vehicle 10 are a passing lane and a travel lane, respectively. In this case, since the vehicle 10 is traveling in the left travel lane 402, it is determined that the current lane is a slow lane.

The determination unit 33 may determine whether the current lane in the curve section corresponds to a travel lane or a passing lane, based on the position of the current lane in an image. For example, in a region where vehicles keep left, as in Japan, when there is no lane on which the travel direction is the same as that of the vehicle 10 on the right of the current lane in an image, the determination unit 33 determines that the current lane is a passing lane, i.e., a fast lane. Conversely, when there is a lane on which the travel direction is the same as that of the vehicle 10 on the right of the current lane in an image, the determination unit 33 determines that the current lane is a travel lane, i.e., a slow lane. When only one or no lane-dividing line is detected on the right of the current lane or when a median strip is detected next to the current lane on the right, the determination unit 33 determines that there is no lane on which the travel direction is the same as that of the vehicle 10 on the right of the current lane.

In some cases, a "yield lane" for slower traffic, such as a climbing lane, is provided in a curve section. In such a case, when the current lane is a yield lane, the determination unit 33 may determine that the current lane is a slow lane. When the current lane is not a yield lane, the determination unit 33 may determine that the current lane is a fast lane.

The determination unit 33 notifies the reference speed setting unit 34 of the result of determination whether the current lane is a fast lane or a slow lane.

The reference speed setting unit 34 sets a reference speed of the vehicle 10 so that the reference speed decreases as the curvature of the current lane increases and that the reference speed is not less when the current lane is a fast lane than when the current lane is a slow lane. A reference speed is a target upper-limit speed at the time when the vehicle 10 enters a curve section, and is set at a speed such that the vehicle 10 can travel through the curve section without suddenly decelerating.

At setting a reference speed, the reference speed setting unit 34 sets one of the lanes in the curve section as a lane used as a reference for setting the reference speed (hereafter a "reference lane"). The reference speed setting unit 34 sets the reference speed, based on the curvature of the reference lane. For example, the reference speed setting unit 34 sets a slow lane as a reference lane. When the number of lanes in the curve section is three or more, the reference speed setting unit 34 sets the lane farthest from a fast lane (e.g., in Japan, the leftmost lane) as a reference lane. Alternatively, the reference speed setting unit 34 may set the innermost lane in the curve section as a reference lane. This prevents the occurrence of a situation in which, when the vehicle 10 enters the curve section, the vehicle 10 decelerates on a fast lane and does not decelerate on a slow lane.

When the current lane differs from the reference lane and the curvature of the reference lane is not represented in the high-precision map, the reference speed setting unit 34 calculates the distance obtained by multiplying the number of lanes from the current lane to the reference lane by the width of each lane as a correction radius. The reference speed setting unit 34 then estimates the curvature of the reference lane to be a value obtained by subtracting the correction radius from the radius of curvature corresponding to the curvature of the current lane. The reference speed setting unit 34 refers to the high-precision map to determine the number of lanes from the current lane to the reference lane and the width of each lane.

The reference speed setting unit 34 preferably corrects the curvature of the reference lane to a value not less than that of the fast lane. This prevents the reference speed during travel of the vehicle 10 on a fast lane from being too high.

The reference speed setting unit 34 determines whether the current position of the vehicle 10 is in a region where a fast lane lies on the right of a slow lane, as in Japan, or a region where, conversely, a fast lane lies on the left of a slow lane, by referring to the high-precision map. The reference speed setting unit 34 further determines whether the curve section is a right curve or a left curve with respect to the travel direction of the vehicle 10, by referring to the high-precision map. When the curve section curves toward the fast lane, e.g., when the current position of the vehicle 10 is in Japan and the curve section is a right curve, the reference speed setting unit 34 corrects the curvature of the reference lane to that of the passing lane, i.e., the fast lane. When the current position of the vehicle 10 is in Japan and the curve section is a left curve, the reference speed setting unit 34 corrects the curvature of the reference lane to that of the leftmost travel lane or a yield lane. In this case, when the leftmost travel lane or a yield lane is set as the reference lane, the reference speed setting unit 34 need not correct the curvature of the reference lane.

With reference again to FIG. 4, the left travel lane (i.e., the slow lane) 402 is set as the reference lane. However, since a curve section 410 ahead of the vehicle 10 is a right curve, the curvature of the right passing lane (i.e., the fast lane) 401 is greater than that of the slow lane 402, which is the reference lane. Hence the curvature of the reference lane is corrected to that of the fast lane 401. If the curve section 410 is a left curve, the curvature of the slow lane 402 is greater than that of the fast lane 401. Hence, in this case, the curvature of the slow lane 402 is set as that of the reference lane.

Upon determining the curvature of the reference lane, the reference speed setting unit 34 identifies the reference speed corresponding to the curvature of the reference lane by referring to the prior deceleration table representing the relationship between curvatures and reference speeds. In the prior deceleration table, the reference speed is set lower as the curvature is greater. The reference speed setting unit 34 sets the identified reference speed as the reference speed applied to the curve section. Thus, the applied reference speed decreases as the curvature of the current lane or the reference lane increases. The reference speed setting unit 34 notifies the control unit 35 of the set reference speed.

According to a modified example, when the curve section curves toward the fast lane, the reference speed setting unit 34 may set the fast lane as a reference lane, regardless of whether the current lane is a slow lane or a fast lane. When the curve section curves toward the slow lane, the reference speed setting unit 34 may set the current lane as a reference lane. In this case, when the curvature of the slow lane is less than that of the fast lane in the curve section, the same reference speed is set, regardless of whether the vehicle 10 is traveling on the slow lane or the fast lane. This prevents the occurrence of a situation in which the vehicle 10 decelerates only on the fast lane. When the curvature of the fast lane is less than that of the slow lane in the curve section, the reference speed is less when the current lane is the slow lane than when the current lane is the fast lane. Thus, the processor 23 can reduce the degree of deceleration of the vehicle 10 traveling on the fast lane, whose curvature is relatively small.

The control unit 35 controls the speed of the vehicle 10 so that the speed of the vehicle 10 at the start point of the curve section will not be greater than the reference speed. To achieve this, the control unit 35 compares the current speed of the vehicle 10 measured by a vehicle speed sensor (not illustrated) provided on the vehicle 10 with the reference speed. When the current vehicle speed is not greater than the reference speed, the control unit 35 controls the vehicle 10 to maintain the current vehicle speed until the start point of the curve section. When the current vehicle speed is greater than the reference speed, the control unit 35 calculates a travel distance required to reduce the speed of the vehicle 10 from the current vehicle speed to the reference speed at a predetermined prior deceleration (hereafter a "deceleration distance"). The control unit 35 then controls the vehicle 10 to decelerate the vehicle 10 at the prior deceleration when the current position of the vehicle 10 indicated by positioning information becomes equal to the position nearer than the start point of the curve section by the deceleration distance (hereafter the "deceleration start point"). More specifically, when the vehicle 10 reaches the deceleration start point, the control unit 35 sets the degree of accelerator opening so that the deceleration of the vehicle 10 becomes equal to the prior deceleration. The control unit 35 then determines the amount of fuel injection according to the set degree of accelerator opening, and outputs a control signal depending on the amount of fuel injection to a fuel injector of an engine of the vehicle 10. Alternatively, the control unit 35 determines electric energy to be supplied to a motor according to the set degree of accelerator opening, and controls a driving circuit of the motor so that the determined electric energy is supplied to the motor. In addition, the control unit 35 sets the amount of braking as necessary, and outputs a control signal depending on the set amount of braking to the brake of the vehicle 10. The prior deceleration is set at a deceleration such that the deceleration of the vehicle 10 in front of a curve section does not make the driver feel uncomfortable, e.g., at the deceleration for the case where the accelerator opening is minimized, or at 0.05 G to 0.15 G.

In addition, while the vehicle 10 is traveling through the curve section, the control unit 35 also controls the speed of the vehicle 10 so that the vehicle 10 can travel through the curve section safely. More specifically, the control unit 35 sets a target speed during travel through the curve section (hereafter a "curve travel speed"), based on the curvature of the current lane in the curve section. To this end, the control unit 35 identifies the travel speed corresponding to the curvature of the current lane by referring to the curve travel speed table representing the relationship between curvatures and travel speeds in curve sections, and sets the identified travel speed as the curve travel speed. The control unit 35 then controls the speed of the vehicle 10 so that the speed of the vehicle 10 is reduced to the curve travel speed. Specifically, the control unit 35 decelerates the vehicle 10 at a deceleration preset for travel through a curve section. The absolute value of the deceleration is set greater than that of the prior deceleration (e.g., at 0.15 G to 0.3 G). The control unit 35 executes control similar to the deceleration before reaching the start point of the curve section to decelerate the vehicle 10.

In addition, the control unit 35 starts accelerating the vehicle 10 in the curve section so that the speed of the vehicle 10 at the end of the curve section will reach a preset speed (hereafter simply a "set speed"). The control unit 35 then controls the speed of the vehicle 10 to accelerate at a predetermined acceleration. The control unit 35 sets the acceleration start point at a position nearer than the end of the curve section by a travel distance required to reach the set speed from the curve travel speed at the predetermined acceleration (hereafter an "acceleration distance"). Similarly to deceleration of the vehicle 10, the control unit 35 further sets the degree of accelerator opening so that the acceleration of the vehicle 10 becomes equal to the predetermined acceleration. The control unit 35 then determines the amount of fuel injection according to the set degree of accelerator opening, and outputs a control signal depending on the amount of fuel injection to the fuel injector of the engine of the vehicle 10. Alternatively, the control unit 35 determines electric energy to be supplied to the motor according to the set degree of accelerator opening, and controls the driving circuit of the motor so that the determined electric energy is supplied to the motor.

The control unit 35 may set the acceleration start point closer to the start point of the curve section when the current lane is a fast lane than when the current lane is a slow lane.

Figure 5:
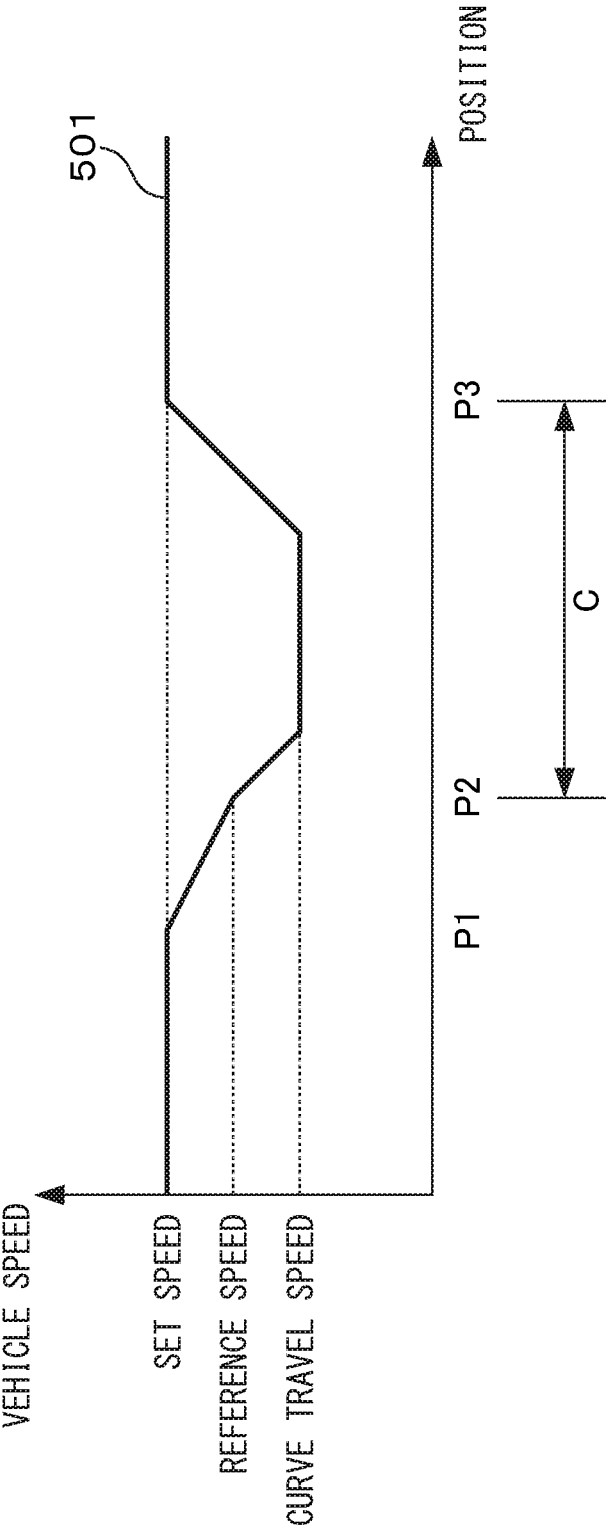
FIG. 5 illustrates an example of deceleration control.

FIG. 5 illustrates an example of deceleration control during travel of the vehicle 10 through a curve section. In FIG. 5, the ordinate represents vehicle speed, and the abscissa represents the position of the vehicle 10. The graph 501 represents the relationship between the position of the vehicle 10 and vehicle speed.

As illustrated in the graph 501, the speed of the vehicle 10 is maintained at the set speed until the vehicle 10 reaches a deceleration start point P1. When the vehicle 10 reaches the deceleration start point P1, the vehicle 10 starts decelerating at the prior deceleration. The speed of the vehicle 10 is reduced to the reference speed when the vehicle 10 reaches the start point P2 of a curve section C. Thereafter, the speed of the vehicle 10 is controlled to further decrease to the curve travel speed in the curve section C, and then increases until the vehicle 10 reaches the endpoint P3 of the curve section. The speed of the vehicle 10 returns to the set speed when the vehicle 10 reaches the endpoint P3 of the curve section.

Figure 6:
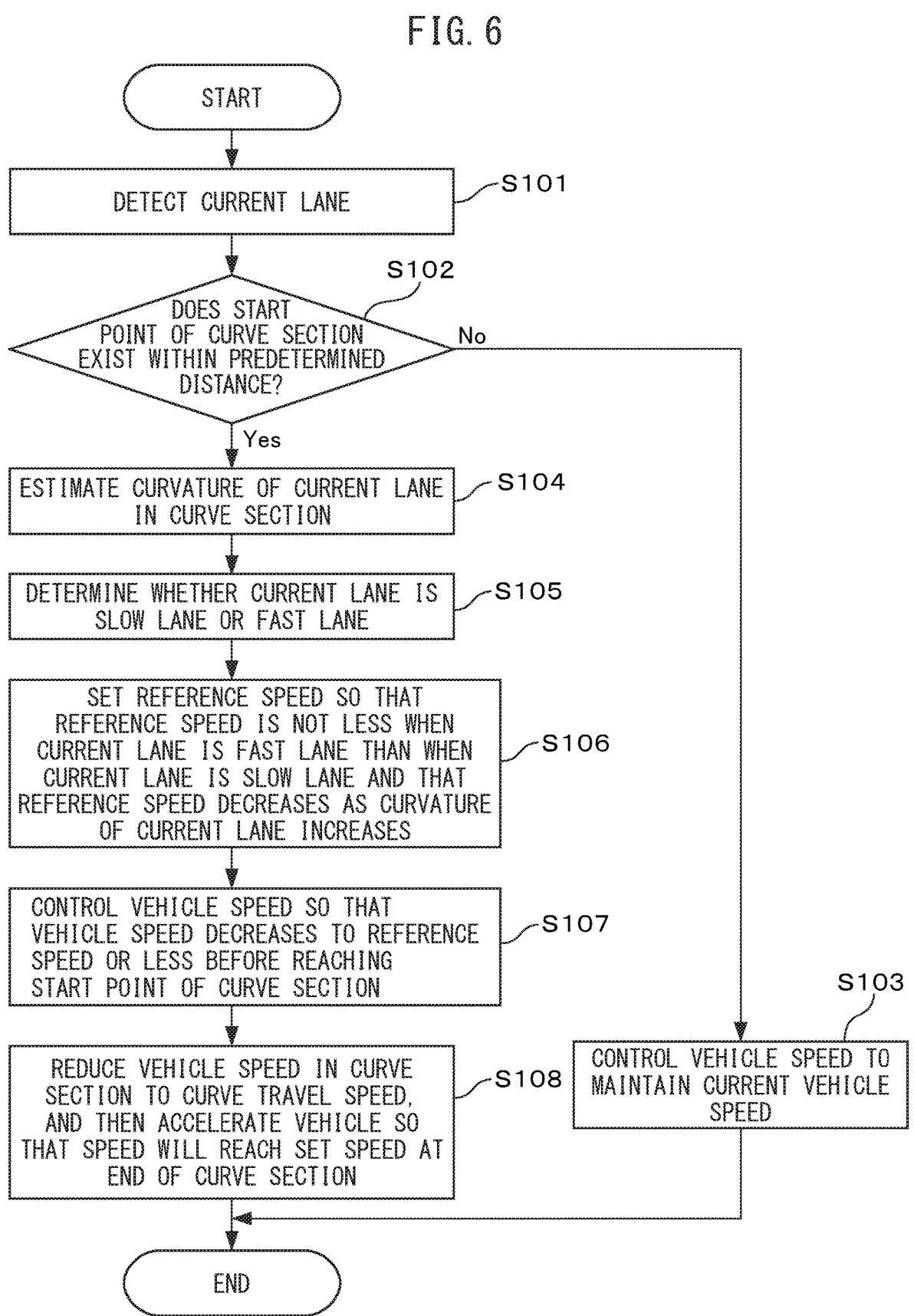
FIG. 6 is an operation flowchart of the vehicle speed control process.

FIG. 6 is an operation flowchart of the vehicle speed control process executed by the processor 23. The processor 23 executes the vehicle speed control process at predetermined intervals in accordance with the operation flowchart described below.

The lane detection unit 31 of the processor 23 detects a current lane on which the vehicle 10 is traveling (step S101). The curvature estimation unit 32 of the processor 23 determines whether the start point of a curve section exists within a predetermined distance ahead of the vehicle 10 (step S102). When the start point of a curve section does not exist within a predetermined distance (No in step S102), the control unit 35 of the processor 23 controls the vehicle 10 to maintain the current speed of the vehicle 10 (step S103). The processor 23 then terminates the vehicle speed control process.

When the start point of a curve section exists within a predetermined distance (Yes in step S103), the curvature estimation unit 32 estimates the curvature of the current lane in the curve section (step S104). The determination unit 33 of the processor 23 then determines whether the current lane is a slow lane or a fast lane in the curve section (step S105).

The reference speed setting unit 34 of the processor 23 sets a reference speed of the vehicle 10 so that the reference speed decreases as the curvature of the current lane increases and that the reference speed is not less when the current lane is a fast lane than when the current lane is a slow lane (step S106). The control unit 35 of the processor 23 controls the speed of the vehicle 10 so that the speed of the vehicle 10 at the start point of the curve section will not be greater than the reference speed (step S107). The control unit 35 then reduces the speed of the vehicle 10 during travel through the curve section to the curve travel speed, and then accelerates the vehicle 10 so that the speed of the vehicle 10 will reach the set speed at the end of the curve section (step S108). Thereafter, the processor 23 terminates the vehicle speed control process.

As has been described above, the vehicle speed controller determines whether the current lane on which the vehicle is traveling is a fast lane or a slow lane in a curve section ahead of the vehicle. In addition, the vehicle speed controller sets a reference speed of the vehicle so that the reference speed decreases as the curvature of the current lane increases and that the reference speed is not less when the current lane is a fast lane than when the current lane is a slow lane. The vehicle speed controller then controls the speed of the vehicle so that the speed of the vehicle at the start point of the curve section will not be greater than the reference speed. By controlling the vehicle speed in this way, the vehicle speed controller can prevent the vehicle from deviating from the current lane even in a curve section. Further, the vehicle speed controller can prevent the occurrence of a situation in which, at entering a curve section, the speed is reduced on a fast lane and not reduced on a slow lane, and can decelerate the vehicle without making the driver feel uncomfortable.

The computer program for achieving the functions of the processor 23 of the ECU 5 according to the embodiment or modified example may be provided in a form recorded on a computer-readable and portable medium, such as a semiconductor memory, a magnetic medium, or an optical medium.

As described above, those skilled in the art may make various modifications to embodiments within the scope of the present invention.

What is claimed is:

1. A vehicle speed controller comprising:
a processor configured to:
   detect a current lane in which a vehicle is traveling,
   detect a start point at which a curved road section starts within a predetermined distance ahead of the vehicle, based on map information or a sensor signal obtained by a sensor provided on the vehicle for sensing an environment around the vehicle,
   estimate the curvature of the current lane in the road section,
   determine whether the current lane is a fast lane where travel at a relatively high speed is allowed in the curved road section or a slow lane where travel at a relatively low speed is required in the road section, based on the map information,
   set a reference speed of the vehicle so that the reference speed decreases as the curvature of the current lane increases and that the reference speed is not less when the current lane is the fast lane than when the current lane is the slow lane,
   control a speed of the vehicle so that the speed of the vehicle at the start point of the curved road section will not be greater than the reference speed,
   reduce the vehicle speed in the curved road section to a curve travel speed that is less than the reference speed, and
   accelerate the vehicle so that the vehicle speed will reach a set speed that is higher than the reference speed at the end of the curve section.

2. The vehicle speed controller according to claim 1, wherein the processor sets one of the lanes included in the road section as a reference lane, and sets the reference speed, based on the curvature of the reference lane.

3. The vehicle speed controller according to claim 2, wherein the processor sets the slow lane of the lanes included in the road section as the reference lane.

4. The vehicle speed controller according to claim 2, wherein the processor sets an innermost lane in the curved road section as the reference lane.

5. The vehicle speed controller according to claim 2, wherein the processor sets the fast lane as the reference lane when the road section curves toward the fast lane, and sets the current lane as the reference lane when the road section curves toward the slow lane.

6. The vehicle speed controller according to claim 2, wherein when the reference lane differs from the current lane, the processor determines the number of lanes from the reference lane to the current lane and the width of each lane in the road section, based on the map information, and calculates the curvature of the reference lane by correcting the curvature of the current lane, based on the distance obtained by multiplying the number of lanes by the width.

7. A method for controlling vehicle speed, comprising:

detecting a current lane in which a vehicle is traveling;

detecting a start point at which a curved road section starts within a predetermined distance ahead of the vehicle, based on map information or a sensor signal obtained by a sensor provided on the vehicle for sensing an environment around the vehicle;

estimating the curvature of the current lane in the road section;

determining whether the current lane is a fast lane where travel at a relatively high speed is allowed in the curved road section or a slow lane where travel at a relatively low speed is required in the road section, based on the map information;

setting a reference speed of the vehicle so that the reference speed decreases as the curvature of the current lane increases and that the reference speed is not less when the current lane is the fast lane than when the current lane is the slow lane;

controlling a speed of the vehicle so that the speed of the vehicle at the start point of the curved road section will not be greater than the reference speed, reducing the vehicle speed in the curved road section to a curve travel speed that is less than the reference speed, and accelerating the vehicle so that the vehicle speed will reach a set speed that is higher than the reference speed at the end of the curve section.

8. A non-transitory recording medium that stores a computer program for controlling vehicle speed, the computer program causing a processor mounted on a vehicle to execute a process comprising:

detecting a current lane in which the vehicle is traveling;

detecting a start point at which a curved road section starts within a predetermined distance ahead of the vehicle, based on map information or a sensor signal obtained by a sensor provided on the vehicle for sensing an environment around the vehicle;

estimating the curvature of the current lane in the road section;

determining whether the current lane is a fast lane where travel at a relatively high speed is allowed in the curved road section or a slow lane where travel at a relatively low speed is required in the road section, based on the map information;

setting a reference speed of the vehicle so that the reference speed decreases as the curvature of the current lane increases and that the reference speed is not less when the current lane is the fast lane than when the current lane is the slow lane;

controlling a speed of the vehicle so that the speed of the vehicle at the start point of the curved road section will not be greater than the reference speed, reducing the vehicle speed in the curved road section to a curve travel speed that is less than the reference speed, and accelerating the vehicle so that the vehicle speed will reach a set speed that is higher than the reference speed at the end of the curve section.

* * * * *